March 25, 1952  S. R. LARGE  2,590,422

BEARING SEAL

Filed Jan. 19, 1946

INVENTOR;
SAMUEL R. LARGE
BY Romeyn A. Spare
HIS ATTORNEY.

Patented Mar. 25, 1952

2,590,422

UNITED STATES PATENT OFFICE 2,590,422

BEARING SEAL

Samuel R. Large, Bristol, Conn., assignor to General Motors Corporation, Detroit, Mich., a corporation of Delaware Application January 19, 1946, Serial No. 642,152

12 Claims. (Cl. 286—5)

1

This invention relates to bearings and particularly to bearing seals which prevent leakage of lubricant from a bearing and which also prevent the entrance of dirt and other deleterious materials into the bearing.

An object of the invention is to provide an improved labyrinth type of seal for sealing the annular space between relatively rotatable parts such as the race rings of an antifriction bearing.

Another object is to provide for an antifriction bearing an improved sealing device having relatively rotatable parts which cooperatively form an everchanging labyrinth during their relative rotation.

Another object is to provide a simple, inexpensive and improved labyrinth type of seal that has relatively rotatable members in yieldable relation to each other and which will maintain an efficient sealing relation even under conditions of misalignment.

To these ends and also to improve generally upon devices of this character, my invention consists in the various matters hereinafter described and claimed. In its broader aspects, the invention is not necessarily limited to the specific structures selected for illustrative purposes in the accompanying drawings in which Figure 1 is an enlarged fragmentary cross sectional view of a portion of an antifriction bearing having one form of the sealing device;

Figure 2 is a perspective view of the slinger-gripping ring shown in Figure 1a;

Figures 3 and 3a are similar fragmentary cross sectional views of antifriction bearings provided with two other forms of related sealing devices; and Figure 4 is a fragmentary sectional view showing the method of mounting the slinger shown in Figure 3a.

Figures 1, 1A:
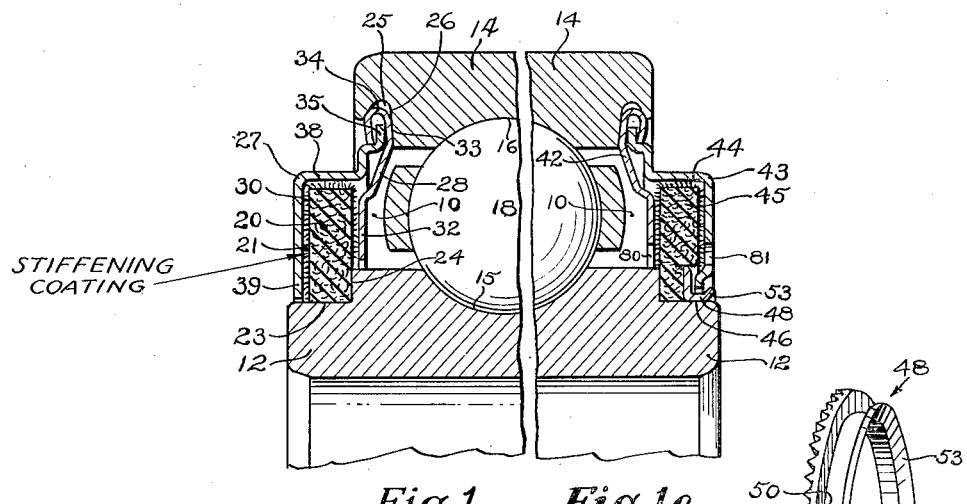
Figure 1a is an enlarged fragmentary sectional view of an antifriction bearing having another embodiment of the sealing device.
Figure 2:
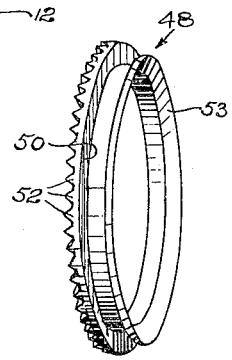

Generally considered, my sealing device closes an end of an annular lubricant chamber 10 between a pair of relatively rotatable members such as antifriction bearing inner and outer race rings 12 and 14 provided with raceways 15 and 16 for receiving rolling elements such as balls 18. An annular shield, carried by one of these race rings, radially extends into closely spaced relation to the other race ring, and a sealing washer or annular slinger, as 20, secured to and rotatable with this other race ring, radially projects into an annular groove formed by this shield. This slinger, which is preferably made of felt or a like material

2 of intermingled fibers, has a surface nap, as 21, composed of closely spaced outwardly projecting lubricant-coated fibers that lightly wipe in antifrictional contact with the inner walls of the shield. The many small interstices between these fibers cooperatively provide between the shield and the slinger body a labyrinth in the general form of a maze whose interconnected passages are so small that dirt will not pass therethrough into the lubricant chamber and lubricant is prevented from leaking out of the lubricant chamber.

Referring to the seal of Figure 1, the inner race ring 12 has a peripheral notch 23 terminating in an annular shoulder 24, and the outer race ring 14 has near its end a circular groove 25 opening towards the inner race ring and merging with an annular shoulder 26. A shield, made of a pair of cooperating dished washers 27 and 28, has an annular recess 30 that opens radially into the notch 23. A side wall 32 of the inner dished washer 28 extends into closely spaced relation with the periphery of the inner race ring 12 adjacent to the shoulder 24, and a flat washer portion 33 is held in seated engagement against the shoulder 26 by a rim 34 which is laterally folded over and against a stepped flange 35 on the dished washer 27 and wedged in non-bottoming sealing engagement within the groove 25 to rigidly mount the shield in position in generally the same manner as disclosed in the United States patent to Murden, Number 2,140,091, and issued December 13, 1938.

My annular slinger 20, which rotates as a unit with the inner race ring 12, is press-fitted on the peripheral notch 23 against the shoulder 24. The body portion of this slinger within the recess 30 is in closely spaced relation to the shield walls 32, 38 and 39, and the short closely spaced fibers of the nap 21, which become coated with lubricant from the chamber 10, lightly wipe in antifrictional contact with these shield walls. The variation in rate of race ring rotation as well as the slight relatively eccentric movements between the flexible slinger 20 and the shield will vary the wiping engagement of the nap fibers causing them to flex so that the small passages between these fibers will change in size and form an everchanging labyrinth or maze which prevents lubricant leakage from the chamber 10 and prevents entrance of dirt into the bearing. In some instances, I have found it convenient to initially treat my slinger 20 with a flexible stiffening material to aid the slinger in maintaining its press-fit in the peripheral notch 23 and to also stiffen the flexible nap fibers. For example, the felt slinger may be initially sprayed with or dipped in a solvent-carried suitable rubber-like compound such as "Thiokol." Evaporation of the solvent leaves the fibers coated with the rubber-like material and leaves the interstices between these fibers to still act as a labyrinth or maze.

The construction of Figure 1a is generally similar. A two-part shield, composed of cooperating dished members 42 and 43, has an annular recess 44 in which rotates a felt-like slinger 45 generally similar to the slinger 20 and press-fitted in a peripheral notch 46 against a shoulder on the inner race ring. The slinger 45 is additionally secured to the race ring 12 by a gripping ring 48 generally U shaped in cross section and provided with an intermediate portion press-fitted in the peripheral notch 46. The inner end of the ring 48 has a flange 50 pressed against the slinger 45, and a set of peripherally disposed teeth 52 laterally project from this side wall into the slinger 45. A side wall of the outer shield member 43 terminates in a stepped portion that extends into a grooved portion of the ring 48 between the side wall 50 and an outwardly flared rim 53 which serves as a slinger to throw deleterious matter away from the seal.

Figures 3, 3A, 4:
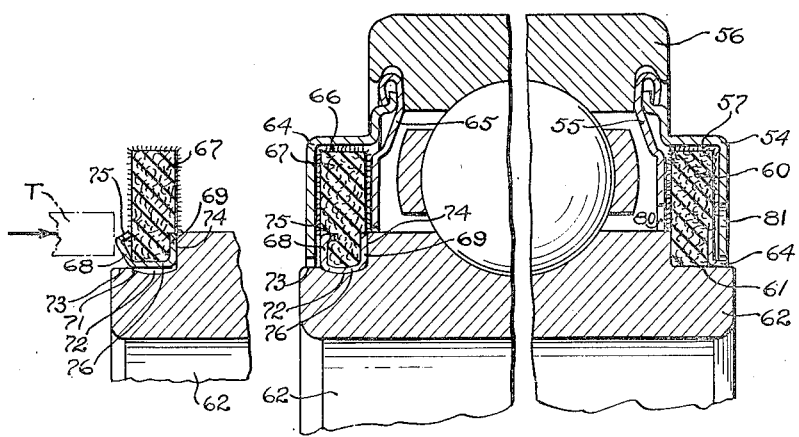

Another and somewhat similar seal construction is shown in Figure 3 wherein a two-part shield composed of cooperating dished washers 54 and 55 are supported by an outer race ring 56 and provide an annular recess 57 that receives an annular felt slinger 60 which is press-fitted in a peripheral end notch 61 on an inner race ring 62. A gripping ring 64, having an L-shaped cross section is pressed onto the bottom of the notch 61 and against the side of the slinger 60 to aid in securing this slinger to the inner race ring for rotation therewith.

Another embodiment is shown in Figure 3a, wherein a two-part shield is composed of interfitted washers 64 and 65 similar to and mounted in the same manner as the dished washers 27 and 28. These washers 64 and 65 provide an annular groove 66 in which rotates a felt-like slinger 67 similar to the slinger 20. The slinger 67 is clamped between the side walls 68 and 69 of a retaining ring of generally U-shaped cross section mounted in a peripheral notch 71 having a shallow peripherally disposed generally arcuate groove 72 transversely extending from a cylindrical land 73 to an annular shoulder 74. Prior to mounting the slinger 67, the side wall 68, which has peripherally disposed and laterally inwardly directed teeth 75 similar to the teeth 52, is bent outwardly from parallel relation to the side wall 69 so that the felt slinger 67 may be stretched and easily inserted within the retaining ring as shown in Figure 4. A bottom wall 76 of this retaining ring is initially cylindrical and of a size to slidably mount over the cylindrical land 73. After the retaining ring and slinger assembly have been mounted in the peripheral notch 71 with the wall 69 located against the shoulder 74, a suitable ring-shaped tool T is forced against the side wall 68 to clamp the slinger 67 between the walls 68 and 69 and to embed the teeth 75 in the slinger. This inward bending of the wall 68 also causes the bottom wall 76 to arcuately deform into fitted relation within the groove 72 so that the slinger and retaining ring assembly are locked to the inner race ring 62 within the notch 71.

As illustrated in the seals of Figures 1a and 3, each of my embodiments may have the inner edge of the inner shield washer radially spaced from the inner race ring as at 80, and one or more holes, as 81, may be provided through the outer shield washer in alignment with the opening 80 so that a hollow needle may be pierced through the felt slinger and used to feed lubricant into the bearing. When this needle is withdrawn, the temporarily displaced felt fibers return to their original positions and the needle-pierced hole disappears.

I claim:

1. In a device of the character indicated, a pair of relatively rotatable inner and outer members having an annular lubricant chamber therebetween, a yieldable annular slinger secured to one of said members for rotation therewith, means on said other member providing an annular groove loosely receiving said yieldable slinger, said groove having side walls in close proximity to said slinger, and a nap on the slinger having closely spaced flexible fibers which project outwardly from the body of the slinger into light wiping engagement with one of said side walls to provide between these fibers a multiplicity of very small interconnecting labyrinthian passages that prevent the entrance of dirt into the lubricant chamber and prevent leakage of lubricant from said chamber.

2. In a device of the character indicated, a pair of relatively rotatable spaced annular members having an annular lubricant chamber therebetween, a yieldable sealing washer secured to one of said members for rotation therewith, means on said other member providing an annular groove loosely receiving said sealing washer, a nap on the sealing washer having a multiplicity of closely spaced lubricant coated flexible fibers which project outwardly from the body of the sealing washer into light wiping contact with at least one side face of the groove to provide between these fibers an everchanging maze of tiny interconnecting passages during relative rotation of said members, these passages being so small that lubricant cannot leak out of the lubricant chamber and dirt cannot enter into the lubricant chamber.

3. In a device of the character indicated, a pair of relatively rotatable inner and outer members having an annular lubricant chamber therebetween, a yieldable annular slinger secured to one of said members for rotation therewith, a shield on said other member providing an annular groove substantially completely filled by and loosely receiving said yieldable slinger, side walls on the shield located closely adjacent to the slinger, and a nap on the slinger having closely spaced lubricant coated flexible fibers that project outwardly from the slinger body into light antifrictional contact with said side walls to provide between these fibers a maze of tiny interconnected passages which are so small that lubricant cannot leak from the lubricant chamber and dirt cannot leak into said chamber.

.4. In a device of the character indicated, a pair of relatively rotatable inner and outer members having an annular lubricant chamber therebetween, a yieldable felt sealing washer secured to one of said members for rotation therewith and radially extending towards said other member, a shield secured to said other member and providing an annular groove that receives the felt sealing washer, side walls on the shield closely adjacent to the sides of the sealing washer, and a nap on the washer having closely spaced outwardly projecting fibers whose outer ends lightly engage said side walls, the spaces between said fibers forming a labyrinth which prevents leakage of lubricant and dirt therethrough.

5. In a device of the character indicated, a pair of relatively rotatable inner and outer members having an annular lubricant chamber therebetween, one of said members having a peripherally extending notch, a yieldable sealing washer of intermingled fibers pressed onto said notch for rotation with said member, a flexible material impregnating the sealing washer to stiffen the washer and provide a thin flexible coating on the fibers without filling the interstices between the fibers, and a shield on the other of said members providing a groove which receives the rotatable sealing washer.

6. In a device of the character indicated, a pair of relatively rotatable inner and outer members having an annular lubricant chamber therebetween, one of said members having a peripherally extending notch, a yieldable sealing washer of felted fibers pressed onto said notch and radially extending towards said other member, a flexible rubber-like material coating said fibers and stiffening the sealing washer, means on the other of said members providing a groove which loosely receives the sealing washer between the sides of said groove, and a nap on the washer having a multiplicity of closely spaced fibers which project outwardly from the body of the sealing washer into light wiping engagement with a side of said groove.

7. In a device of the character indicated, a pair of relatively rotatable inner and outer annular members having an annular lubricant chamber therebetween, one of the members having a peripherally extending notch terminating in a shoulder, a yieldable sealing washer mounted in said notch against the shoulder and radially extending towards said other member, a gripping ring pressed onto the notch against the sealing washer to clamp the washer in position, a shield on said other member providing a groove that receives said washer, and a nap on the washer having a multiplicity of closely spaced fibers which extend outwardly from the body of the washer into light wiping engagement with a side of said groove.

8. In a device of the character indicated, a pair or relatively rotatable inner and outer annular members having an annular lubricant chamber therebetween, one of the members having a peripherally extending notch terminating in a shoulder, a yieldable sealing washer mounted in said notch against the shoulder and extending towards said other member, a gripping ring pressed onto the notch against the sealing washer, a shield projecting from said other member and having a groove which receives the sealing washer, and a peripherally extending slinger rim on the gripping ring outside of said shield.

9. In a device of the character indicated, a pair of relatively rotatable inner and outer annular members having an annular lubricant chamber therebetween, one of the members having a peripherally extending notch, a yieldable sealing washer mounted in said notch, a gripping ring pressed onto the notch and having a flange pressed against the washer to secure the washer in position, a slinger rim on the gripping ring, a shield projecting from said other member and having an annular groove which receives the sealing washer, and a sidewall on said shield which extends into closely spaced relation with the gripping ring between said flange and said rim.

10. In a device of the character indicated, a pair of relatively rotatable inner and outer annular members having an annular lubricant chamber therebetween, one of the members having a peripherally extending notch, a yieldable sealing washer mounted on said notch and radially extending towards said other member, a gripping ring pressed onto said notch and having a flange pressed against the sealing washer, laterally projecting teeth on said flange embedded in the sealing washer, and a shield on said other member having an annular groove receiving said sealing washer.

11. In a device of the character indicated, a pair of relatively rotatable inner and outer annular members having an annular lubricant chamber therebetween, one of the members having a peripherally extending notch, a retaining ring in said notch, a sealing washer supported by the retaining ring and radially projecting therefrom, said retaining ring being deformed into gripping relation with the sealing washer and with said notch, and a shield on said other member having an annular groove which receives the sealing washer.

12. In a device of the character indicated, a pair of relatively rotatable inner and outer annular members having an annular lubricant chamber therebetween, one of the members having a peripherally extending notch, the bottom of said notch having a peripherally extending groove, a retaining ring in said notch and having a bottom wall connecting a pair of spaced annular side walls, a sealing washer gripped by said side walls, the bottom wall being deformed into gripping engagement with the notched member within said groove, and a shield on said other member provided with an annular groove that receives the sealing washer.

SAMUEL R. LARGE.

REFERENCES CITED

The following references are of record in the file of this patent:

UNITED STATES PATENTS

| Number | Name | Date |
|---|---|---|
| 1,594,838 | Kegresse | Aug. 3, 1926 |
| 1,910,061 | Schatz | May 23, 1933 |
| 2,054,580 | Delaval-Crow | Sept. 15, 1936 |
| 2,132,838 | Weckstein | Oct. 11, 1938 |
| 2,137,546 | Searles | Nov. 22, 1938 |
| 2,403,687 | Shafer | July 9, 1946 |
| 2,463,568 | Shelton | Mar. 8, 1949 |

FOREIGN PATENTS

| Number | Country | Date |
|---|---|---|
| 371,379 | Italy | of 1939 |